United States Patent
Yungul

[11] 3,965,412
[45] June 22, 1976

[54] DETERMINATION OF THE POLARITY OF REMANENT MAGNETIZATION OF AN EARTH FORMATION PENETRATED BY A BORE HOLE USING AN ACCURATE MAGNETOMETER

[75] Inventor: Sulhi H. Yungul, Fullerton, Calif.

[73] Assignee: Chevron Research Company, San Francisco, Calif.

[22] Filed: July 29, 1974

[21] Appl. No.: 492,639

[52] U.S. Cl. .................................................. 324/8
[51] Int. Cl.² .................... G01V 3/00; G01V 3/18
[58] Field of Search ............................... 324/1, 6, 8

[56] References Cited
UNITED STATES PATENTS

| | | | |
|---|---|---|---|
| 2,259,904 | 10/1941 | McNamee et al. | 324/8 |
| 2,401,280 | 5/1946 | Walstrom | 324/8 |
| 2,664,542 | 12/1953 | Lynn | 324/8 |
| 2,716,730 | 8/1955 | Williams | 324/8 |
| 3,014,177 | 12/1961 | Hungerford et al. | 324/8 |
| 3,317,821 | 5/1967 | Patton et al. | 324/8 |
| 3,369,174 | 2/1968 | Groenendyke et al. | 324/8 |
| 3,391,335 | 7/1968 | Patton et al. | 324/8 |

*Primary Examiner*—Gerard R. Strecker
*Attorney, Agent, or Firm*—R. L. Freeland, Jr.; H. D. Messner

[57] ABSTRACT

In accordance with the present invention, at least the polarity of the direction of the remanent magnetization of an earth formation penetrated by a bore hole is accurately measured utilizing a highly sensitive magnetometer, positioned within the bore hole so as to decrease sensitivity of the instrument to the induced magnetization of the adjacent earth formation while maintaining high resolution for detection of the natural remanent magnetization property of the formation. Preferred logging posture: the magnetometer is positioned such that its response direction is in a plane orthogonal to the earth's normal field in a given azimuthal direction.

11 Claims, 5 Drawing Figures

DETERMINATION OF THE POLARITY OF REMANENT MAGNETIZATION OF AN EARTH FORMATION PENETRATED BY A BORE HOLE USING AN ACCURATE MAGNETOMETER

RELATED APPLICATION FILED SIMULTANEOUSLY HEREWITH AND INCORPORATED HEREIN BY REFERENCE

S. H. Yungul, Ser. No. 492,638, for "DETERMINATION OF THE POLARITY OF REMANENT MAGNETIZATION OF AN EARTH FORMATION PENETRATED BY A BORE HOLE USING A HIGHLY ACCURATE MAGNETOMETER FOLLOWED BY PROCESSING OF RESULTING AS WELL AS ASSOCIATED DATA"

BACKGROUND OF THE INVENTION

1. Field of the Invention

The present invention relates to a method for determining at least the polarity of the direction of remanent magnetization of an earth formation penetrated by a bore hole so as to indicate the geologic age of a segment of the formation and to document stratigraphic boundaries occurring, say, during generation and migration of petroleum over a given span of geologic time such as when accumulative traps were generated.

Geologic dating of the relevant adjacent sections of strata within a bore hole by conventional means is both time-consuming and costly. Use of in-hole dating equipment such as magnetometers and the like has not been successful in age-dating due to inaccuracy of the generated results. Use of cores of sediments, i.e., long cylinders of successive layers of sediment, is likewise costly and requires extensive well time to accomplish.

2. Background of the Prior Art

It is well known in carrying out geologic dating that the magnetization of a section of earth formation is associated with magnetic fields that are intrinsic to that body and act at a distance from it. Since the direction and strength of the field can be identified, there can be gained an indication of both origin of the body and, hence, its geologic age assuming the field of interest can be accurately determined.

That the magnetization of a given sample volume of an earth formation is a source of potential magnetic field in accordance with the following equation is well known:

$$M = \vec{M_R} + K\vec{H_o}$$

where $M$ equals the magnetization or magnetic dipole moment per unit volume of a sample;

$\vec{M_R}$ equals the natural remanent magnetization of the sample; and $K\vec{H_o}$ equals the induced magnetization of the sample.

In contrast with the above known functional relationship, the measurement of the contribution of the natural remanent magnetization can be difficult to obtain since measurements are carried out in the presence of the earth's field. Not only is the intensity of the anomaly due to the remanent magnetization small in comparison with the induced magnetization, but also its direction is dependent upon the paleomagnetic origin of the sample as well as subsequent movement of the sample remote from the origin as a function of geologic time, ("continental drift").

SUMMARY OF THE INVENTION

In accordance with the present invention, the direction of the remanent magnetization of an earth formation penetrated by a bore hole is accurately measured utilizing a high-sensitivity and directional magnetometer positioned within the bore hole so as to decrease sensitivity of the instrument to the induced magnetization of the earth's formation while maintaining high resolution for detection of the natural remanent magnetization property of the formation. Preferred logging posture: the axis of response of the magnetometer is normal to the earth's normal field in a given azimuthal direction such that it identifies only the flux associated with the remanent magnetization in a plane normal to the earth's field. Since the response of the magnetometer is also a function of angular direction, means can also be provided for azimuthal rotation of the magnetometer in a plane perpendicular to the earth's magnetic field. Also, the azimuth for which signal intensity is maximum indicates polarity of a paleomagnetic reversal present in the adjacent earth formation which can then be used to indicate the age of the formation, if desired.

In accordance with the present invention, orientation of the magnetometer to minimize sensitivity to the induced magnetization while maintaining high sensitivity to the natural remanent magnetization properties of the sample is not a mere happenstance, but is based on a combination of discoveries, including the facts: (1) That oil is usually produced from rock sources of the Cenozoic (Tertiary) and Mesozoic eras deposited onto continents and continental margins during a time span where the continents were drifting in a northwardly direction as breakup of Laurasia and Gondwanaland occurred (as explained in "The Break-up of Pangea", *Scientific American*, October 1970, Gondwanaland comprised South America, Africa, India, Antarctica and Australia; Laurasia ncluded North America, Europe and Asia); (2) That in a majority of today's petroleum provinces the vertical component of the induced magnetization ($K\vec{H_o}$) is larger than its horizontal component, whereas the vertical component of the remanent magnetization ($\vec{M_R}$) is smaller than its horizontal component; and (3) That the angle between the two magnetization vectors $K\vec{H_o}$ and $\vec{M_R}$ is usually large, about 50°.

Based upon factors such as the above, in accordance with the present invention, it has been found that if the directivity pattern for response of the magnetometer is disposed in a direction normal to the earth's normal field within a bore hole at a given depth, there will be resulting increased sensitivity such that the true indication of the polarity of the direction of remanent magnetization of the adjacent formation can be accurately determined.

In providing correct reorientation commands to the magnetometer at a given logging depth within the bore hole, however, the direction of the earth's normal magnetic field must be known. In determining the direction of the earth's normal magnetic field, the earth's normal field is measured at the earth's surface at points preferably unaffected by the remanent magnetization of surrounding rocks. The techniques of measuring the direction and magnitude of the earth's magnetic field at the surface are well described in geophysical literature. For example, an earth induction technique can be used to determine declination and inclination of the earth's field using a plurality of test points, say in a 4- or 6-spot pattern surrounding the well of interest. Likewise, the attitude of the borehole at the mapping station of interest must be taken into account. Such techniques are likewise well known in the literature.

Within a bore hole but while maintaining its posture orthogonal to the earth's normal field, the magnetometer undergoes sequential rotation in azimuth. Conventional timing signals — in appropriate field codes — are generated so as to provide for the above-mentioned azimuthal rotation. Within the magnetometer itself, signals indicative of the magnitude of the remanent field are detected and sent up-hole for recording at the earth's surface.

OBJECT OF THE PRESENT INVENTION

The object of the present invention is the provision of a novel method for accurately indicating at least the polarity of the direction remanent magnetization of an earth formation penetrated by a well bore, using a highly sensitive magnetometer located within the well bore reposing in a position so as to maximize response to the natural remanent magnetization of the formation while minimizing sensitivity to the induced magnetization property of the same formation, whereby the absolute or relative geologic age of the relevant earth formation at depth can be easily and accurately determined.

FURTHER OBJECTS OF THE INVENTION

Further objects and features of the invention become readily apparent to those skilled in the art from this specification and appended drawings illustrating preferred embodiments.

DETAILED DESCRIPTION OF SPECIFIC EMBODIMENTS

Figures 1, 5:
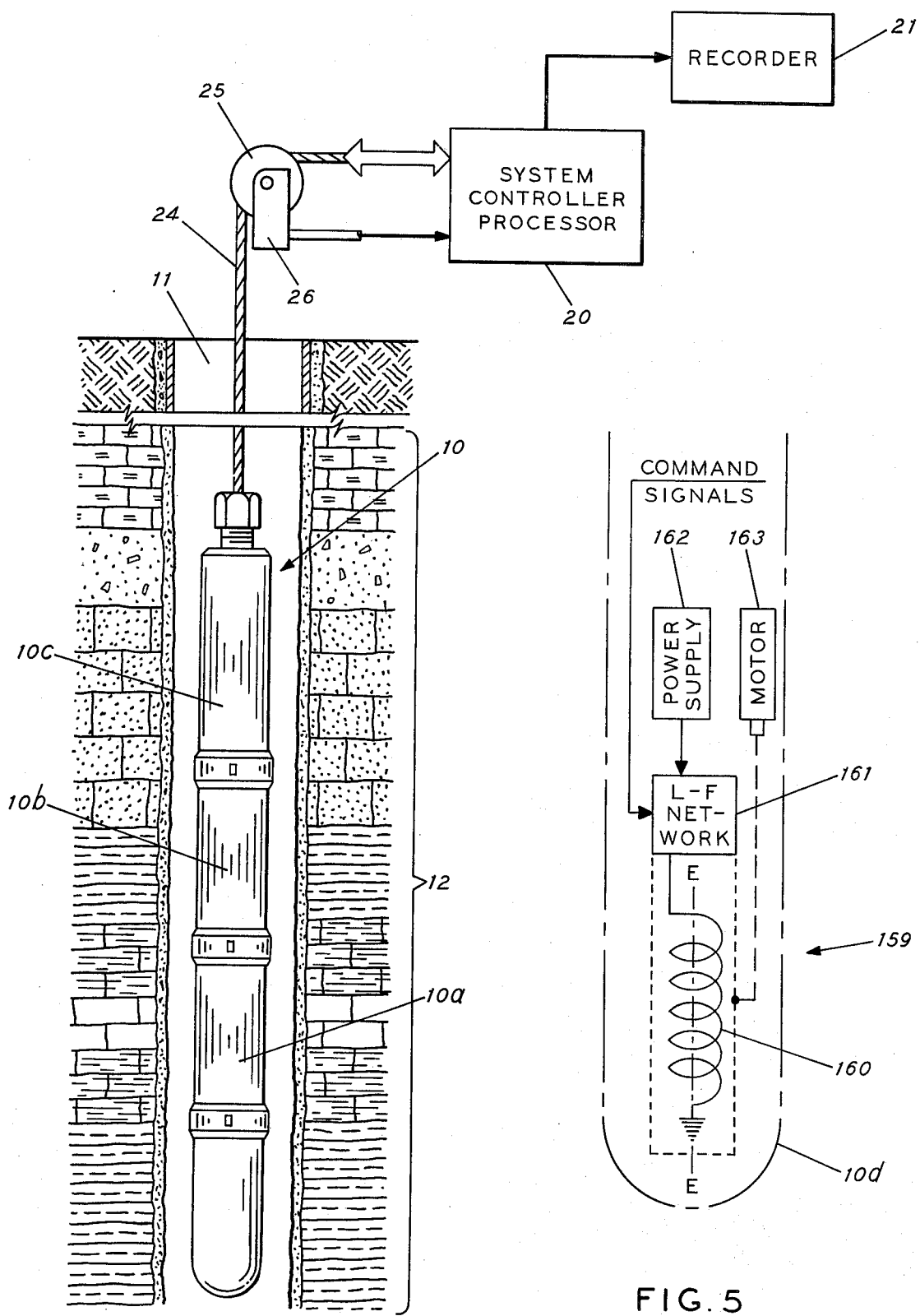
FIG. 1 is a sectional view of a bore hole penetrating an earth formation illustrating the position of a logging sonde incorporating a highly sensitive magnetometer useful in identifying the remanent magnetization characteristics of the adjacent formation.
FIG. 5 is a sectional view, partially schematic, of the logging sonde of FIG. 1, illustrating a depolarizing coil and circuitry means for generating an alternating depolarizing field in the formation prior to magnetization measurements.

References should now be had to the figures, and in particular to FIG. 1. In FIG. 1, a logging sonde 10 is seen to be located at a selected logging depth within bore hole 11 adjacent to earth formation 12. The sonde 10 is provided with a series of axial abutting sections: a highly sensitive magnetometer section 10a is seen to attach below circuitry control and energization sections 10b and 10c. The purpose of the magnetometer section 10a: to provide means for measuring the remanent magnetization of earth formation 12, as explained in detail below.

In accordance with the present invention, the direction and indications of magnitude of the remanent magnetization associated with the earth formation 12 penetrated by the well bore 11 are determined utilizing a magnetometer operationally controlled via controller-processor 20 at the earth's surface, after being carefully positioned within the magnetometer section 10a of the logging sonde 10 to assume an attitude of maximum response to the magnetization. Not only is the remanent magnetization of the earth formation 12 a principal factor in providing geologic age-dating of the formation 12, but additionally there also can be provided correlation information of considerable value; i.e., correlation of bedding from well to well may have desirable value in indicating boundaries of sedimentary basins.

In order to provide support of the logging sonde 10 within the well bore, a cable 24 is seen to be attached to uppermost section 10c of the logging sonde 10. Cable 24 also includes a series of conductors. These conductors interconnect sections 10a, 10b and 10c with controller-processor 20 at the earth's surface, as explained below. Suffice it to say that in operation, energization signals are passed from the controller-processor 20 through slip-bearing assembly 25 and thence through the conductors to circuitry within sections 10b and 10c of sonde 10 for controlling the magnetometer within section 10a of the sonde 10. During detection of the remanent magnetization of the earth formation 12, signal transmission is reversed: signals pass from the magnetometer section 10a upward through sections 10b and 10c, cable 24 and thence through slip-ring assembly 25 to the controller-processor 20 and then in proper sequence to recorder 21, where the information is recorded. Within the controller 20, circuits can be provided for providing associated information such as depth of the magnetometer, its azimuth and intensity of the received magnetic data in a format compatible with later processing. The mapping depth data are provide through an encoder 26 connected to the controller-processor 20; azimuthal direction of the origin of the remanent magnetization as well as intensity are also indicated and recorded through a cooperative functioning of the controller-processor 20 in conjunction with recorder 21, as explained below. By associating depth, azimuth and magnetization indications as explained below, information can be assimilated to indicate the geologic age of the formation being mapped.

Figure 2:
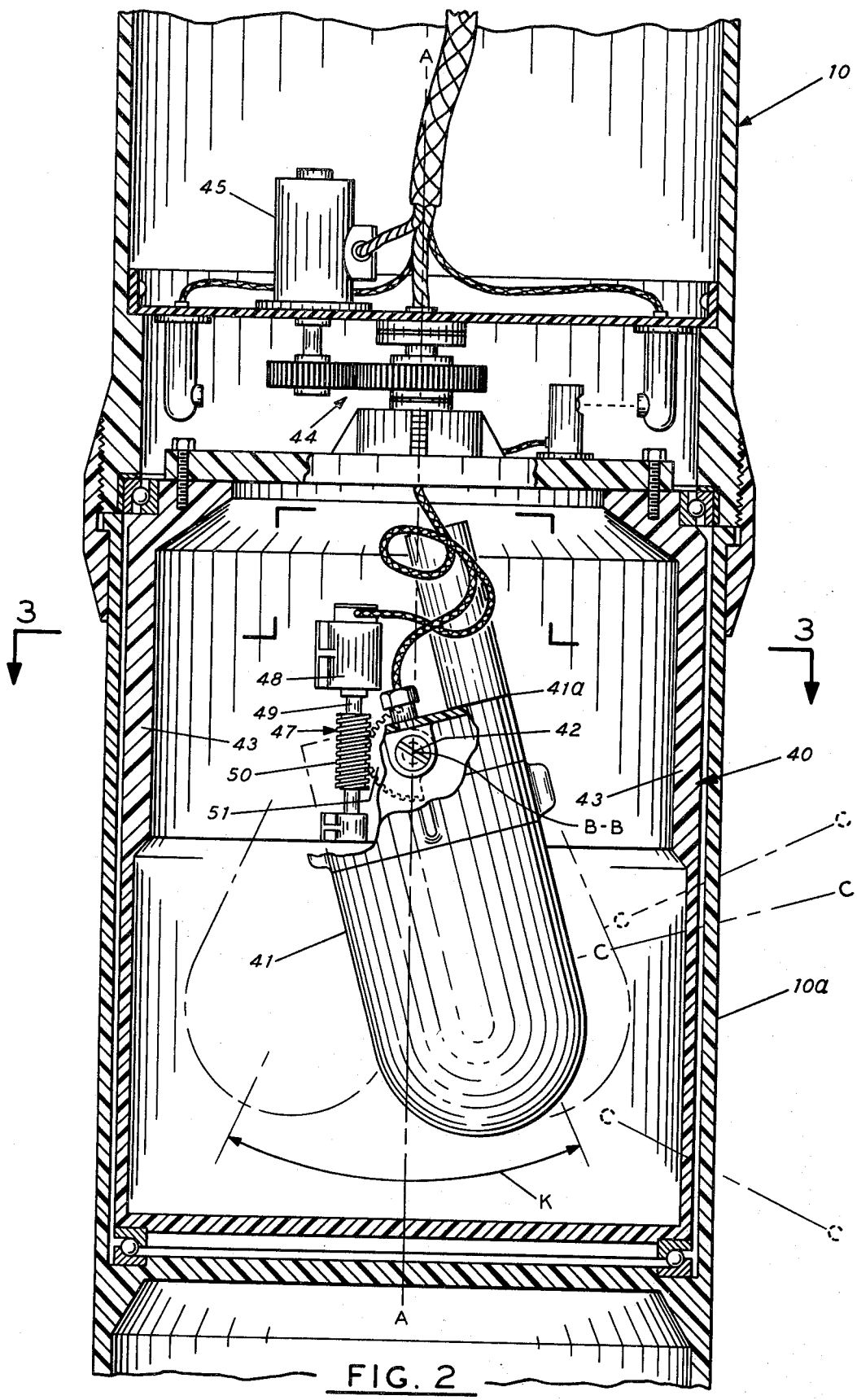
FIG. 2 is a partial sectional view of the logging sonde of FIG. 1 in which both a magnetometer support capsule, as well as driving equipment for reorienting the magnetometer capsule in azimuth, are shown in detail.

Specific reference should be had to FIG. 2 illustrating magnetometer section 10a of the logging sonde 10 in more detail. Section 10a is seen to include a cylindrical housing 40. Interior of the housing 40 is a magnetometer capsule 41 supported by horizontally disposed shaft 42.

Cylindrical housing 40 is capable of rotational movements, in azimuth, relative to side wall 43 about axis of symmetry A—A, through operation of gear train 44 of motor 45. Both occurrence and extent of said travel are carefully controlled through appropriate downhole circuitry previously mentioned, such circuitry including sensing assembly 46 which provides both relative and absolute (azimuth) directional information. For the former, a light source 46a and a series of four photocells 46b, are used; for the latter, a gyrocompass assembly (not shown) is provided. With special reference to gathering relative directional data, note that each photocell is spaced 90° from an adjacent photocell. Since capsule 41 is affixed to housing 40, their azimuthal movements are in tandem; however, it also should be mentioned that the capsule 41 is capable of independent movement relative to the housing 40 about a second axis B—B of FIGS. 2 and 3 through energization of gear train 47 of motor 48. The purpose of reorientation of the capsule 41; to maximize sensitivity of response of the magnetometer within the capsule 41 so that the detecting elements of the latter defines axis of maximum response perpendicular to the earth's field at the depth at which investigations are carried out, say over arc K relative to axis B—B, as shown in FIG. 2.

Figure 3:
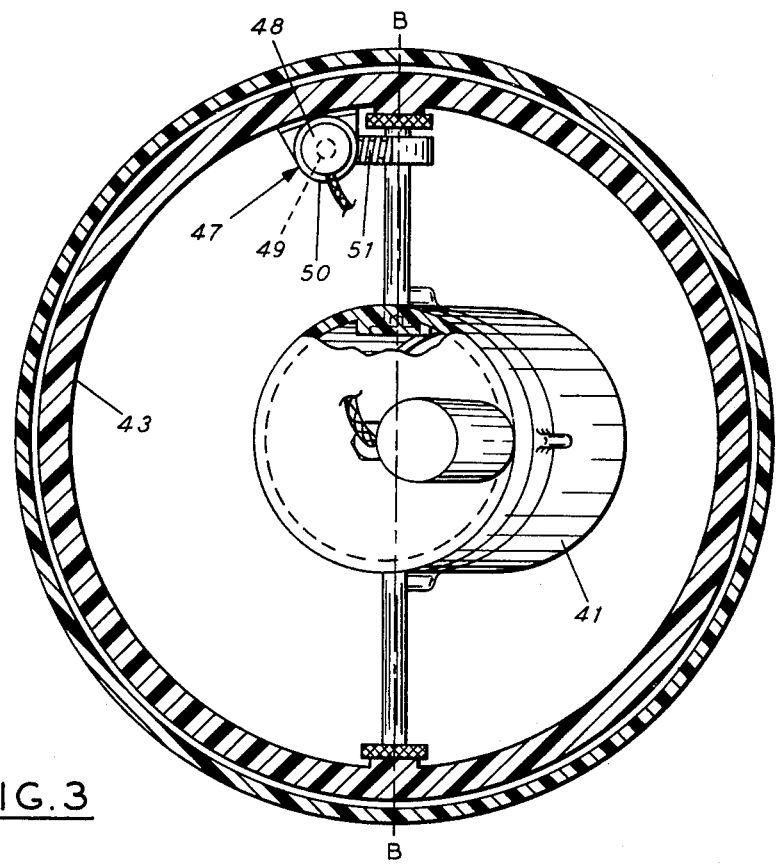
FIG. 3 is a plan view of the magnetometer capsule of FIG. 2.

FIG. 2 illustrates the gear train 47 and motor 48 in more detail. As shown, motor 48 has a shaft 49 formed with a worm gear 50 in contact with a sector gear 51. As shown in FIG. 3, the sector gear 51 is attached to the support shaft 42 defining the aforementioned axis B—B about which independent rotation of capsule 41 can occur. Attachment occurs near the journaling end of the shaft 42 to the side wall 43 of the housing 40 in order to minimize vibrational fatigue.

In accordance with the present invention, orientation of the capsule 41 of FIG. 2 relative to axis B—B must be carefully controlled. For this purpose, it is proposed to controllably activate motor 48 for rotation of the capsule 41 about axis B—B along arc K, such orientation taking place well prior to insertion of sonde 10 within the bore hole to be investigated, but can occur at the mapping depth of interest, if desired. Reason: the axis of maximum response C—C of the magnetometer of FIG. 2 must be in a plane perpendicular to the present earth's field at the depth of interest. In this way, the magnetometer is positioned to minimize sensitivity to the induced magnetization while maintaining high sensitivity to the natural remanent magnetization properties of the sample; however, such attribute is not a mere happenstance, but is based on a combination of discoveries, including the facts: (1) That oil is usually produced from rock sources of the Cenozoic (Tertiary) and Mesozoic eras deposited onto continents and continental margins during a time span when the continents were drifting in a northwardly direction as breakup of Laurasia and Gondwanaland occurred (as explained in "The Break-up of Pangea", *Scientific American*, October 1970, Gondwanaland comprised South America, Africa, India, Antarctica and Australia; Laurasia included North America, Europe and Asia); (2) That in a majority of today's petroleum provinces the vertical component of the induced magnetization ($K\vec{H}_o$) is larger than it horizontal component, whereas the vertical component of the remanent magnetization ($\vec{M}_R$) is smaller than its horizontal component; (3) that the angle between the two magnetization vectors, $K\vec{H}_o$ and $\vec{M}_R$, is usually large, about 50°.

Further, as to (1), (2) and (3), above, while most oil-producing sources are associated with the Cenozoic and Mesozoic eras, more particularly with Tertiary and Mesozoic rocks, there are the following additional factors:

a. a majority of today's petroleum provinces lie at an average 40°N latitude which can be normalized to 28°N paleolatitudes for the Cenozoic and 25°N for the Mesozoic, assuming a Laurasian origin for the rock source, b. the average inclination of the induced magnetization is equal [corresponding to (a) above] to 60°N, c. further, because the primary source of remanent magnetization in sedimentary rocks is detrital remanent magnetization of which the original inclination is lower than that of the orienting field in accordance with the equation tan Ir = 0.4 tan I, where Ir is the inclination of the remanent field and I is the ambient field inclination; accordingly, for (a) above when inclination of the external field was about 43°, i.e., $I = 43°$, then Ir = 20°N, d. however, the average inclination of the induced magnetization of (a), i.e., at 40°N latitude, is about 60°N, e. while (a)–(d) relate to deposits of Laurasian origin, the reverse seems to apply to sources associated with Gondwanaland, e.g., these lands appeared to have been closer to the South Pole than to the Equator at least through the Mesozoic, while today they are closer to the Equator. The average latitude of Australia was 70°S in the Triassic, 45°S in the Eocene, and is 25°S today. Therefore, in some parts of the Gondwana, the remanent magnetization inclination is 80°S, the present normal field is 40°S if the secular variaton is removed. It is well known that the long-term average positions of the magnetic poles coincide with the geographic poles. The nondipolar field, which is primarily in the form of anomalies of the order of 5,000 km in extent, shifts on the surface of the earth at about 1 cm/sec. Therefore, the long-time average of the field (say 10,000 years) is close to a dipolar field whose axis coincides with the geographic axis. Thus, the long-time average of the inclination, I, is related to the average geographic latitude, y, during that period by means of the simple dipolar field relation, $\tan I = 2 \tan y$, f. then there is the third case, in which a deposition sample moved from a southerly latitude to a northerly one, say from 25°S to 25°N. The present earth's field has a northerly inclination, the remanent magnetization a southerly one, and the angle between them is large, g. in all cases since the continents drifted northward appreciably, there ought to be a large angle between the earth's present field and remanent magnetization vectors. The inclination error may increase or decrease this angle; it increases for most of the major oil fields. An average figure is probably somewhere between 40° and 70°, so far as the petroliferous sedimentary basins are concenrmed.

Based upon factors such as the above, in accordance with the present invention, it has been found that if the directivity pattern for response of the magnetometer is disposed in a direction normal to the earth's normal field within a bore hole at a given depth, there will be resulting increased sensitivity such that the true indication of the polarity of the direction of remanent magnetization of the adjacent formation can be accurately determined.

However, correct orientation of the capsule 41 in a plane perpendicular to the earth's field at the logging depth of interest presupposes that the earth's normal field has been accurately measured. For this purpose, an earth induction technique can be utilized as previously described, whereby the declination and inclination of the earth's normal field (at the earth's surface) can be determined.

Thereafter, motor 48 of FIG. 2 is activated at the earth's surface. Capsule 41 is reoriented relative to axis B—B so that at the depths of interest the axis of response C—C of the magnetometer of FIG. 2 is at right angles to the earth's normal field. Thus, although the magnetization of the sample varies as a function of both the natural remanent magnetization ($\vec{M_R}$) as the induced magnetization ($K\vec{H_o}$), (these terms being previously described) the magnetometer sensitivity function [at least to maximum magnetic flux lines of the natural remanent magnetization ($\vec{M_R}$)] is enhanced since, inter alia, continental drift of Mesozoic and Tertiary basins in a northwardly direction produce large angular differences between these comonents of interest, as explained hereinbefore.

Variations in the methodology of carrying out the present inventions can occur.

For example, it should be obvious that atop the capsule 41 there can be provided a servosystem so that reorientation of the capsule 41 at the earth's surface can be automatically accomplished. That is, a signal comparator circuit could provide energization of motor 48 based upon signal inputs computed from the directional data. In that way, the capsule 41 can be driven in rotation until a standard reference signal level (within the comparator) is achieved.

Response of the magnetometer of FIG. 2 is maximum to flux lines parallel to its axis of maximum response C—C. Result; if the axis C—C is correctly aligned at each logging depth, the remanent manetization component thereof can be quite accurately determined. However, it should be noted that included in the aforementioned measurement may be a small residual parameter associated with the earth's normal field, and hence with the induced magnetization of the formation. Errors in measuring the earth's normal field direction or in accurately orientating the magnetometer within the bore hole may create the above anomaly. However, the polarity of the remanent magnetization can still be accurately determined even though its exact magnitude may be somewhat masked. Thus, at any mapping depth where a maximum azimuthal-related value has been obtained, a paleomagnetic reversal polarity within the adjacent formation is likewise accurately indicated.

The operational functions of the controller-processor circuit 20 of FIG. 1 of the present invention are most easily divided into operating cycles related to (i) recording the magnetic signals and (ii) generating and recording information related to the depth and azimuthal direction of response of the magnetometer within logging section 10a, as set forth in detail below.

INDICATING REMANENT MAGNETIC SIGNALS AT DEPTH

Figure 4:
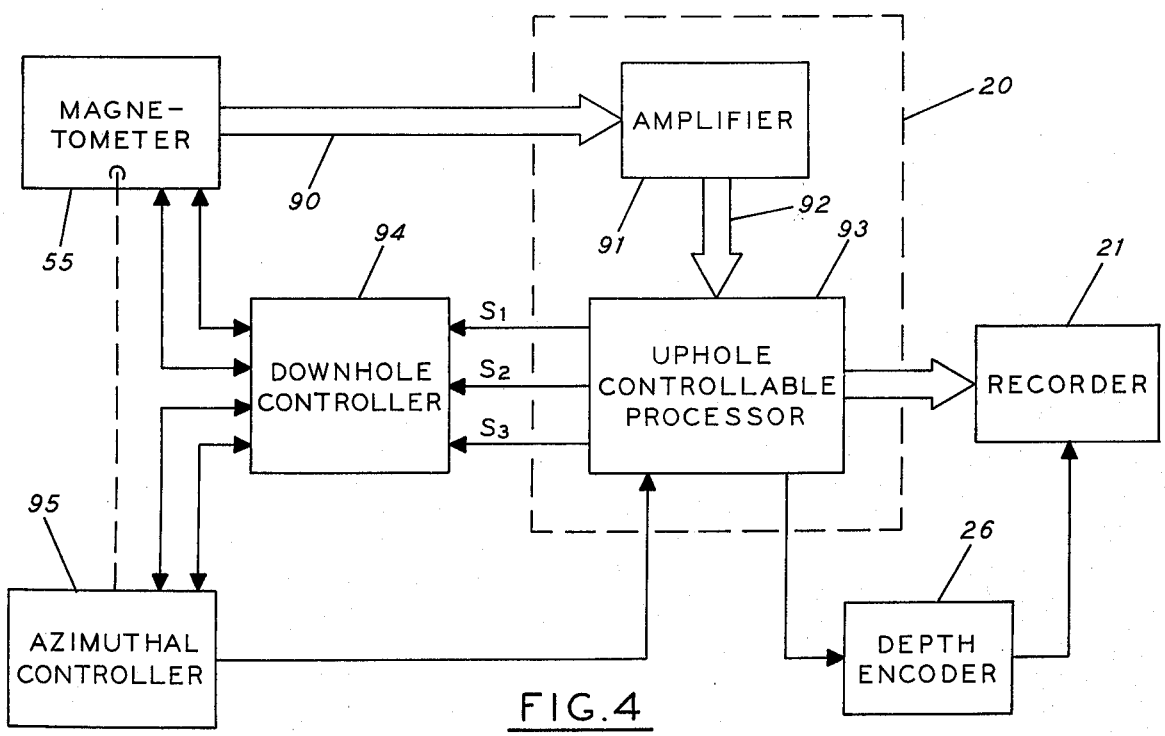
FIG. 4 illustrates, in functional block form, the remanent magnetic logging system, including the magnetometer of FIGS. 2 and 3, for carrying out the method of the present invention.

As shown in FIG. 4, the output from the magnetometer 55 enters the controller-processor 20 via conductor means 90, thence through amplifier 91 and conductor means 92 to uphole controller-processor 93, and finally to recorder 21. Within the uphole processor 92 as well as in downhole controller 94, logic and timing circuits are provided for correct sequential operations of the system of the present invention. For example, within the processor 93 a series of timing signals can be produced which are applied to downhole controller 94 through conductor means 95. The purpose of the timing signals: to coordinate operations of circuit elements as to when each must perform a preselected function. Whole operations are preferably performed in synchronism. Each operation requires the passage of a certain number of timing signals and, consequently, the timing to complete any one of the various operations is an exact multiple or fraction of each other. Thus, the recording at the recorder 21 can be accomplished at specific intervals of time that are exact multiples of the timing signals, is desired.

Several elements of the processor-controller 20 may be in need of further illustration. That is, if the amplitude of the magnetometer response signals is to be digitally recorded, it must be first sampled, in sequence, over a plurality of very small time intervals, and then the results transferred to an analog-to-digital converter, where the digital results of the multiplexing operation are represented as a series of multi-bit binary code indications. The binary code information is suited for storage onto a magnetic tape at the recorder 21. Otherwise, the signals can be recorded in a conventional amplitude-vs.-time (analog) fashion.

AZIMUTHAL AND DEPTH DATA

In addition to controlling the recording of the detected remanent magnetic signals, the controller-processor 20 of FIG. 4 can also be used to assimilate azimuthal and depth data. From FIG. 4, it is seen that connected to processor 20 are depth encoder 26 and azimuthal controller/encoder 96, the latter through downhole controller 94. When the processor 20 generates a series of enabling signals, such signals being indicated in FIG. 4 as $S_1$, $S_2$, and $S_3$ at the controller 94, a series of functions is carried out in sequence related to operations of the magnetometer 55 and the azimuthal controller/encoder 96.

Consider that the logging sonde has been located at a depth in the bore hole to be investigated. Depth encoder 26 of FIGS. 1 and 4 is then activated to generate data indicative of that depth. By convention, such annotation is usually recorded at the header section of the record being generated by the recorder 21. The synchronization of the encoding is by way of timing circuits within the uphole controller-processsor 20 so that the depth data — in proper format — can be gated to the recorder 21, say, well prior to any azimuthal rotation of the magnetometer 55.

As previously described with reference to FIG. 4, the purpose of uphole processor 20 is to provide a series of timing signals for controlling operation of downhole controller 94, magnetometer 55 and azimuthal controller/encoder 96 as explained hereinbefore. Thus, these circuits are seen to be connected as shown in FIG. 4 with the processor 20 in series between the downhole controller 94 but in the latter in parallel with azimuthal controller/encoder 96 and the magnetometer 55. By the way, control knobs (not shown) can be used to vary the duration of the signals $S_1$–$S_3$ at uphole processor 93 if field conditions dictate.

Downhole controller 94 is preferably of conventional design so as to provide two sets of enabling signals: a first set for energizing the motor 45 (FIG. 2) to cause azimuthal movement of the detecting elements of the magnetometer from one position to the next adjacent position as well as for controlling azimuthal controller/encoder 96; and a second group of signals for operation of the magnetometer itself.

Consider that the magnetometer 55 is in a disabled state. It just furnished measurements of the remanent field component of the earth's formation at one of the four sublogging positions, i.e., at position No. 1 or No. 3 of FIG. 2 established by interaction of photocells 46b and source 46a within the sonde 10. In rotating the magnetomer detecting elements to their next positions, a series of signals has been generated and passed to azimuthal controller/encoder 96 of FIG. 4: (i) to open motor 45 to energy flow from a source (not shown); (ii) to activate light source 46a after a suitable delay by delay circuit means (not shown), usually in conjunction with a switching network; and (iii) to activate absolute azimuth measuring means (also not shown). When encoding azimuthal position, it should be noted that the angular distance between the four positions dictating position Nos. 1–4 can progressively increase so that the time required to change from position is indicative of a single final relative azimuthal position of the detecting elements of the magnetometer. As to absolute azimuthal position, such azimuthal measuring means can be of conventional design, say so as to include an analog compass measuring apparatus which produces a signal indication of compass direction, also recordable at the recorder 21 of FIG. 4. When the detecting elements of the magnetometer are positioned at the next correct position, one of the photocells 46b unique to that position is activated to create a stop signal, so as to (i) deactivate the light source 46a, (ii) disable motor 45, and (iii) enable the magnetometer through further operation of downhole controller 94 in conjunction with uphole controller-processor 93, as previously explained.

As to (iii) above, the enabling signal from the downhole controller 94 (FIG. 4) for activation of circuitry associated with the detecting elements of the magnetometer 55 is for the purpose of enabling power supplies (not shown) connected to the magnetometer as through a switching and gate network, also not shown. Signals from the magnetometer 55 indicative of remanent magnetization of the rock sources adjacent to the borehole pasSs uphole to the processor-controller 20 and thence to recorder 21.

MAGNETOMETER 55

The magnetometer 55 must provide directional as well as amplitude resolution within acceptable limits. In this regard, it has been found that the magnetometer 55 of FIGS. 2–3 should have an accuracy of 0.01 gamma (RMS), where a gamma is $10^{-5}$ gauss, in order to provide acceptable remanent magnetization data. For example, a Fluxgate magnetometer can be utilized for this purpose.

Fluxgate magnetometers use a ferromagnetic core of high permeability. The remanent magnetic field of interest can be superimposed upon a cyclic field induced by a sufficiently large AC signal in a coil about the core magnet. Result: saturation of the core occurs, and the time in the energization cycle of such saturation is a measure of the intensity of the field of interest. For example, see the following U.S. Pat. Nos.: (i) 2,975,360 for "Magnetometer Flux Meter and Gradiometer"; (ii) No. 2,942,180 for "Magnetic Field Measuring System" (iii) 2,942,179 for "Magnetometer Circuit"; (iv) 3,159,785 for "Second Harmonics Magnetometer Having a Plurality of Transducers in Combination with Means Responsive to Flux Amplitude and Direction"; and (v) 3,470,461 for "Magnetic Resonance Device for Measuring Magnetic Field Gradients".

After signals or a series of signals indicative of the intensity of the field associated with the remanent magnetization have been generated, such signals pass uphole to the controller-processor 20 of FIG. 4 and thence to the recorder 21.

MODIFICATIONS

Two-component system: While the use of a single magnetometer 55 has been specifically described with reference to the embodiment of FIGS. 1–4, it should be emphasized that a combination of two directional magnetometers could be used to simplify field operations. For example, to avoid the requirement of rotation in a plane normal to the earth's normal field, such a two-component system would include two magnetometers (two-component system) where axes of response are 90° offset from each other but remain in a common plane normal to the earth's field during operations to define a composite axis of response orthogonal to the earth's normal field. However, since their axes of response remain relatively fixed in space, only the true azimuthal direction of one of the magnetometers need be known. Hence, a single compass direction, such as defined by an analog compass measuring means producing a signal indicative of compass direction provides enough information to fix the direction of the component of remanent magnetization response that lies in the plane normal to the earth's field; hence the polarity of the remanent magnetization is provided.

Depolarization System: It may be desirable in some applications to generate an alternating depolarizing field prior to detecting the remanent magnetization at each logging station. Purpose of such field: to remove suitable degrees of remanent magnetization such as viscous remanent magnetization from the formation at each station in a way that does not obscure the component of detrital remanent magnetization of interest.

In more detail as shown in FIG. 5, a depolarizing coil means 159 is seen to be housed, say within a depolarizing coil section forming the terminus of the logging sonde 10 of FIG. 1, although obviously it could also be housed in a separate sonde, if desired. Depolarizing coil means 159 includes depolarizing coil 160. The coil 160 includes a series of turns of constant spacing defining an axis of symmetry E—E, and is connected at one end to the housing of sonde 10d and at the other end to logic-to-field convertor switching network 161. The convertor network 161 converts a command signal (say from the process controller 20 of FIG. 1) to a field signal for connecting the coil 160 to AC power supply 162. The depolarizing coil 160 is usually activated when the depolarizing sonde section is at a given logging station prior to positioning the magnetization section at the same station. Thus, when an AC current flows through the depolarizing coil 160 occurs, say at 1–2000 Hz, to generate a 100 gauss field (minimum), there is effective elimination of undesired degrees of remanent magnetization in the adjacent formation but without adding anhysteretic remanent magnetization in the measuring direction, i.e., normal to the earth's field.

While specified preferred embodiments of the invention have been described by way of illustration only, it should be understood that the invention is capable of many other specific embodiments and modification, and thus is to be solely defined by the following claims.

What is claimed is:

1. A method of detecting at least the polarity of the direction of remanent magnetization associated with a rock source within an earth formation traversed by a well bore which comprises:

a. fixedly positioning, depthwise, in said well bore magnetometer means defining an axis of response substantially orthogonal to the normal geomagnetic field of the earth at a known mapping depth in a selected azimuthal direction of repose;
b. energizing said magnetometer means;
c. azimuthally rotating said magnetometer means so as to provide a series of readings, each of which sensing a component of said remanent magnetization normal to the earth's field in a known azimuthal direction;
d. comparing the intensities of said azimuthally related readings to indicate a maximum and determining therefrom at least the polarity of direction of said remanent magnetization of said rock source at said known mapping depth.

2. The method in accordance with claim 1 further characterized by repeating steps (a), (b), and (c) in sequence at a plurality of mapping depths along said well bore so as to map the entire vertical extent of the well bore.

3. The method in accordance with claim 1 wherein step (d) is further characterized by interpreting said series of azimuthally related readings at said mapping depth whereby an azimuthal direction for which one of said series of readings is maximum is indicative of a paleomagnetic reversal polarity within said rock source under survey.

4. The method of claim 1 with the addition of step of recording each of said readings as a function of both mapping depth and azimuth.

5. The method in accordance with claim 1 in which step (a) is further characterized by said magnetometer means including two separate magnetometers having first and second axes of response substantially orthogonal to each other and to the earth's normal field at said known mapping depth, as well as in which said axis of response is a composite of said first and second axes, likewise substantially orthogonal to the earth's normal field but azimuthally substantially parallel to flux lines associated with a remanent magnetization component of interest.

6. The method in accordance with claim 1 in which step (a) is further characterized by said magnetometer means including a single magnetometer having its axis of response controllably positioned substantially orthogonal to the earth's normal field.

7. The method in accordance with claim 6 in which step (a) is further characterized by the precursor substeps of:
i. obtaining measurements indicating the true direction of the earth's normal magnetic field at the earth's surface in the vicinity of said well bore to be traversed by said single magnetometer;
ii. obtaining the attitude data of said well bore at the logging depth of interest; and
iii. reorienting the magnetometer at the earth's surface so that said magnetometer has maximum response to remanent magnetic flux substantially orthogonal to the earth's normal magnetic field at said logging depth of interest.

8. The method of claim 1 with the precursor step of positioning depolarizing coil means including a depolarizing coil in a logging sonde within said well bore and a selectively operatable current generating means connectable to said depolarizing coil, said current generating means being controllably operative to selectively drive an alternating current through said depolarizing coil at a frequency of 1–2000 Hz to generate an alternate polarizing field within said earth formation at a depth of interest prior to detecting magnetization characteristics of said formation.

9. The method of claim 1 further characterized by the precursor substeps of:
i. selectively positioning a depolarizing coil within said well bore at said known mapping depth, and
ii. driving said coil with an alternate current at a frequency of between 1 to 2000 Hz to provide an alternating depolarizing field within said earth formation for the purpose of removing unstable degrees of remanent magnetizations in said earth formation at said mapping depth prior to the monitoring of remanent magnetic intensity in said plane orthogonal to the earth's normal field.

10. A method of detecting at least the polarity of the direction of remanent magnetization associated with a rock source within an earth-formation traversed by a well bore which comprises:
a. positioning a depolarizing coil at a known logging depth within said well bore,
b. driving said coil at a frequency of 1–2000 Hz to provide an alternating depolarizing field within said earth formation;
fixedly positioning, depthwise in said well bore magnetometer means defining an axis of response substantially orthogonal to the normal geomagnetic field of the earth at said known mapping depth in a selected azimuthal direction of repose,
d. energizing said magnetometer means;
e. azimuthally rotating said magnetometer means so as to provide a series of readings each of which sensing a component of said remanent magnetization normal to the earth's field in a known azimuthal direction;
f. comparing the intensities of said azimuthally related readings to indicate a maximum, and determining therefrom at least the polarity of direction of said remanent magnetization of said rock source at said known mapping depth.

11. The method of claim 10 wherein step (f) is further characterized by interpreting said series by azimuthally related readings whereby an azimuthal direction for which one of said reading is maximum is indicative of a paleomagnetic reversal direction within said rock source under survey.

* * * * *